United States Patent [19]

Lippert

[11] Patent Number: 5,090,509
[45] Date of Patent: Feb. 25, 1992

[54] INTERLOCK DEVICE, ESPECIALLY FOR A PRESSURE-MEDIUM ACTUATOR OF THE AXIAL-PISTON TYPE

[75] Inventor: Reinhold Lippert, Kirchheim, Fed. Rep. of Germany

[73] Assignee: Mercedes-Benz AG, Fed. Rep. of Germany

[21] Appl. No.: 602,764

[22] Filed: Oct. 24, 1990

[30] Foreign Application Priority Data

Oct. 25, 1989 [DE] Fed. Rep. of Germany ....... 3935443

[51] Int. Cl.⁵ ............................................. B62D 5/06
[52] U.S. Cl. ......................................... 180/140; 92/24; 92/27
[58] Field of Search .................. 180/132, 140; 280/91; 92/24, 25, 27, 140

[56] References Cited

U.S. PATENT DOCUMENTS

| | | | |
|---|---|---|---|
| 3,453,937 | 7/1969 | Haberman | 92/25 |
| 4,295,413 | 10/1981 | Kamimura | 92/27 |
| 4,463,657 | 8/1984 | Tootle | 92/25 |

Primary Examiner—Charles A. Marmor
Assistant Examiner—Anne M. Boehler
Attorney, Agent, or Firm—Evenson, Wands, Edwards, Lenahan & McKeown

[57] ABSTRACT

An interlock device for a pressure-medium actuator, having a locking slide received in a housing and with an adjusting slide arranged transversely relative to the said locking slide and coupled kinematically to the locking slide, and, in an interlock position of a locking element connected to the locking slide, at least one positive engagement member provided on the locking element is in engagement with a corresponding mating engagement member on the actuator.

1 Claim, 1 Drawing Sheet

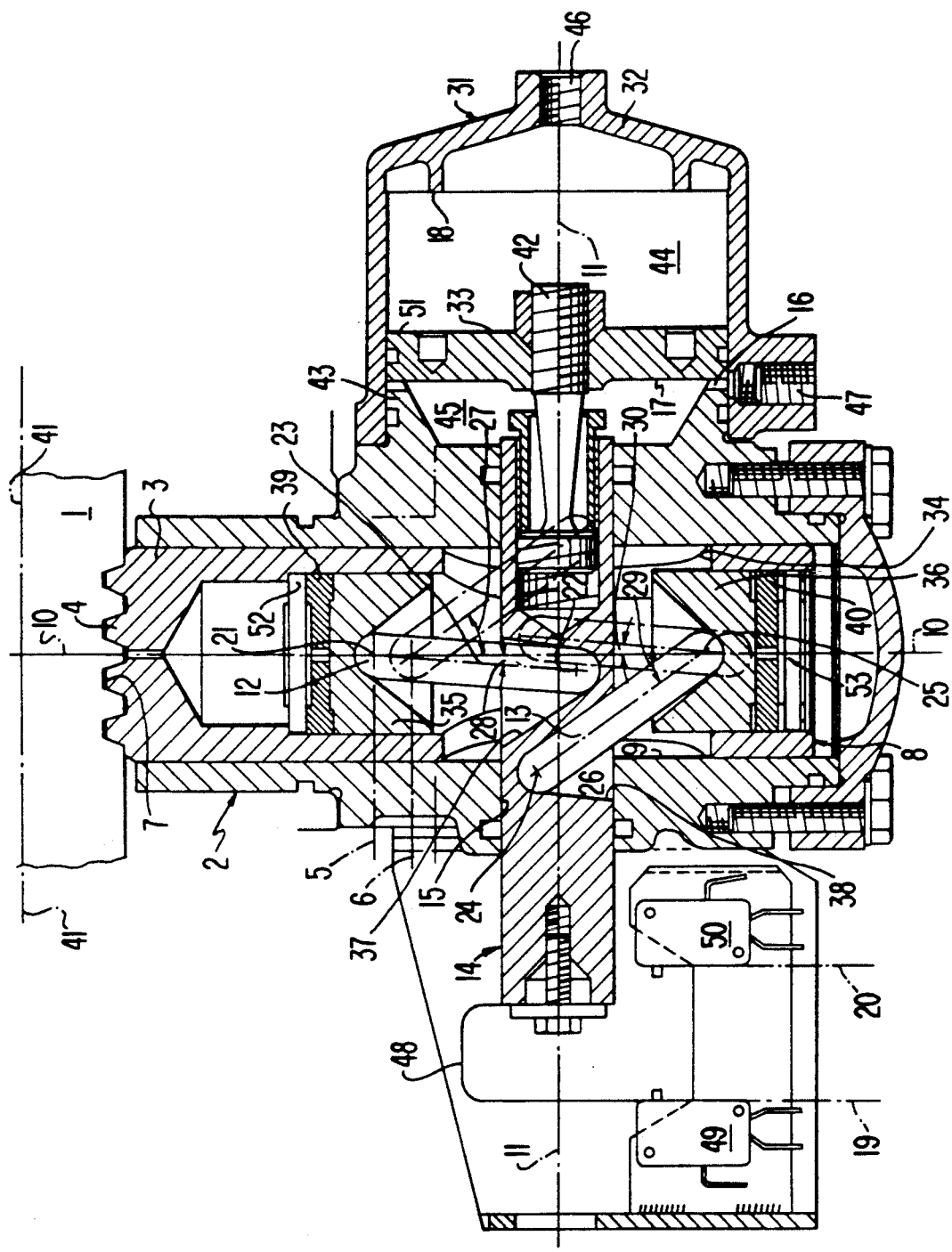

ical 32 and on which the adjacent piston end face (also used as counterstop) comes to bear.

INTERLOCK DEVICE, ESPECIALLY FOR A PRESSURE-MEDIUM ACTUATOR OF THE AXIAL-PISTON TYPE

BACKGROUND AND SUMMARY OF THE INVENTION

The invention relates to a pneumatically operated interlock device adapted for use with a pressure medium actuator of the axial-piston type.

German patent DE 3,233,940 C1 discloses a quick-clamping device for the clamping of tools or workpieces, having a displaceable locking slide and a slide like adjusting element coupled thereto by means of two tappets. The two tappets act in the same direction on the locking slide, their adjusting strokes being added together, that is to say, within the meaning of the present invention, they actuate the locking slide in the direction of the interlock position. The locking slide is fixed to a dual action clamping piston of the axial-piston type, which is aligned with it and which can be subjected simultaneously to the same working-pressure medium in relation to the axial piston actuating the adjusting element. The total stroke of the two tappets is used to actuate the locking slide over its relatively large idling stroke, so that a small stroke and high working pressures can be provided for the actual clamping operation, whereas a low working pressure is considered sufficient for the idling stroke. In this known quick-clamping device, the locking slide cannot be retained mechanically (that is, without the force of a pressure medium) in the end positions of the axial piston actuating the adjusting element, by actuation of the tappets beyond the dead center position, because the adjusting element is arranged movably along the axis of the housing bore receiving the locking slide, as a result of the stroke of its clamping piston, must have in relation to the housing a greater axial movability which cannot be canceled by the total stroke of the tappets.

German patent DE 3,434,054 A1 discloses a positional interlock device for drive shafts, in which the drive shaft has a toothed rim, into the tooth spaces of which a locking bar can be pushed radially. Engaging with the locking bar is an eccentric drive, the eccentric pin of which is clamped between two sliding bodies movable in the radial direction within the locking bar. The two sliding bodies are biased in the direction of the eccentric pin. Fixed sensors interact with parts of the locking bar, in order to switch off the eccentric drive when the dead center position is exceeded by a predetermined angle, at which the locking bar is held with a self-locking effect by mean of the force of the springs, without the need for force to be exerted by the eccentric drive.

In another known interlock device (German Patent Specification 3,427,160), the engagement member of the locking element consists of a rack profile which, in the interlock position, engages into a mating rack profile on the piston rod of a pressure-medium actuator of the axial-piston type working as a hydrostatic steering motor of an additional steering of a motor vehicle. For this purpose, the working cylinder of the steering motor has a lateral orifice, into which the housing of the interlock device is inserted from outside.

The object of the present invention is to provide a compact actuating means for a locking element with an interlock position and a free position, which facilitate effective retention of the two end positions.

This object is achieved by means of an interlock device according to the invention, in which the additional tappet actuates the locking slide into its free position, as does the other tappet, by passing through a dead center position, whilst at the same time compressing an elastic cushion, thus ensuring a retention of the two end positions without the action of an auxiliary pressure-medium force.

Other objects, advantages and novel features of the present invention will become apparent from the following detailed description of the invention when considered in conjunction with the accompanying drawings.

BRIEF DESCRIPTION OF THE DRAWING

The single Figure of the drawing illustrates a cross-sectional view of an interlock device according to the invention.

DETAILED DESCRIPTION OF THE DRAWING

A housing 2 of an interlock device has a receiving bore 9, in which a sleeve-shaped locking slide 8 is guided displaceably. Arranged on one end of locking slide 8, is a locking element 3 having engagement members 4 which are designed in the form of a rack profile which, in the illustrated interlock position 5 of the locking slide 8, are in engagement with mating engagement member 7, likewise in the form of a rack profile.

The rack profile forming the mating engagement member 7 is made in one piece with a piston rod 1 which can be guided movably in the directions of the piston axis 41-41 and which can be connected fixedly in terms of movement to the axial piston of a pressure-medium actuator used as a hydrostatic steering motor of an additional steering of a motor vehicle.

The housing 2 has a further receiving bore 15 which is arranged with its geometrical axis 11-11 perpendicular to the geometrical axis 10-10 of the first receiving bore 9, the two axes 10-10 and 11-11 lying in a common plane (the drawing plane). Guided displaceably in the receiving bore 15 is an adjusting slide 14 which passes with play through a passage 34 formed by two mutually aligned orifices in the cylindrical casing of the locking slide 8.

The adjusting slide 14 is actuated via a piston rod 42 by a pressure-medium actuator 31, the working cylinder 32 of which is mounted in a pressure-proof manner and fixedly in terms of movement on a corresponding entering flange 43 of the housing 2. The interior of the working cylinder 32 is subdivided by means of an axial piston 33 into two working-pressure chambers 44 and 45, each of which has a pressure connection 46 and 47 respectively for connecting associated pneumatic working-pressure lines.

The adjusting slide 14, at its end opposite the actuator 3 and projecting from the housing 2, is equipped with a U-shaped actuating member 48 which actuates an associated limit switch 49 in the illustrated end position 19 of the adjusting slide 14, and an associated limit switch 50 in the other end position 20.

To fix the end position 19, the centering flange 43 has a stop 16, against which the adjacent piston end face 17 (used as a counterstop) of the axial piston 33 comes to bear. To fix the other end position 20, there is a stop 18 which is located on the inner wall of the working cylinder 32 and against which the other end face 51 of the axial piston 33 used as a counterstop comes to bear.

In order to actuate the locking element 3 into the interlock position 5 shown, the two slides 8 and 14 are connected kinematically to one another by means of a tappet 12. The locking slide 8 has an inner ball socket 35, on which the tappet 12 is supported by means of its one spherical tappet end. The ball socket 35 is guided axially movably in the central bore of the locking slide 8, but, in the direction of the bore axis 10-10 pointing towards the piston rod 1, is supported via an elastic cushion 39 against a rigid disc-shaped thrust bearing 52 which is arranged immovably relative to the locking slide 8.

Correspondingly, the adjusting slide 14 is equipped with a ball socket 37 which is made in one piece with it and in the form of a pocket-shaped recess and on which the tappet is supported by means of its other spherical tappet end.

The tappet 12, with its tappet axis 23 passing through the two points of articulation or joint centers 21 and 22 on the ball sockets 35 and 37, forms a relatively small angel 28 with the geometrical axis 10-10 when the tappet 12 is in its end position which is associated with the end position 19 of the adjusting slide 14, and therefore with the interlock position 5 and in which it is illustrated.

The tappet 12, in its other end position which is represented by broken lines and which it assumes in the end position 20 of the adjusting slide 14, forms with its tappet axis 23 a larger angle 27 with the axis 10-10, these end positions of the tappet 12 being located on different slides on the axis 10-10, 10, so that the tappet 12 assumes a dead center position when its tappet axis 23 is aligned with axis 10-10.

Since the ball sockets 35 and 37 are at a shorter distance from one another in the direction of the axis 10-10 than would be necessary per se in respect of the length of the tappet 12, the tappet 12 can pass through its dead center position only whilst at the same time compressing the elastic cushion 39. This ensures a simple and efficient retention of the interlock position 5 of the locking element 3, for which the smaller angle 28 is needed as a fraction of the translational shift of the tappet 12 between its end positions.

In order to actuate the locking element 3 into a free position 6 represented by a dot-and-dash lines, the two slides 8 and 14 are connected kinematically to one another by means of a further tappet 13 which, in a corresponding way to the tappet 12, is supported in an articulated manner by means of it spherical tappet ends on a ball socket 36 of the locking slide 8 and on a ball socket 38 of the adjusting slide 14. In the free position 6, the engagement members 4 of the locking element 3 are out of engagement with the mating engagement member 7 of the piston rod 1.

Whilst one ball socket 38 is again designed as a pocketshaped recess and in one piece with the adjusting slide 14, the other ball socket 36 guided axially displaceably in the central bore of the locking slide 8 is supported, in the direction of the geometrical axis 10-10 pointing away from the piston rod 1, via an elastic cushion against a rigid disc-shaped thrust bearing 53 of the locking slide 8.

The tappet 13 too, in it illustrated end position associated with interlock position 5, forms with its tappet axis 26 passing through the two points of articulation or joint centers 24 and 25 a relatively large angle 29 with the geometrical axis 10-10 which corresponds essentially to that fraction of the translational shift of the tappet 13 between its end positions necessary for switching the locking element 3. In contrast, the angle 30 which, in the end position represented by dot-and-dash lines and corresponding to the free position 6 and therefore to the end position 20 of the adjusting slide 14, the tappet axis 26 forms with the geometrical axis 10-10 and which is used for effecting a retention of the free position 6 is once again relatively small. For this purpose, the two end positions of the tappet 13 are likewise located on either side of the geometrical axis 10-10, so that the tappet 13 has to pass through a dead center position in which its tappet axis 26 is aligned with the axis 10-10. In the direction of the axis 10-10, the distance between the ball sockets 36 and 38 is once again shorter than would be necessary in respect of the length of the tappet 13, and therefore it is possible for the tappet 13 to pass through the dead center position only whilst at the same time compressing the elastic cushion 40.

The hydrostatic steering motor of the piston rod 1 can be arranged, for example, on the rear axle or on one of the rear axles of a motor vehicle. The switching of the locking element 3 is then obtained from a switch on the dashboard by subjecting the working-pressure chambers 44 and 45 alternately to compressed air.

The driver always has information on the operating state of the additional steering via optical indicator means on the dashboard which are controlled by the limit switches 49 and 50.

The operating reliability of the interlock device is high because of the positive toggle-like retention of the locking element 3 in the end position.

The thickness or elasticity of the cushions 39 and 40 can be so calculated in the direction of the axis 10-10 that, in one or both of the end positions 19 and 20, the associated stops 16, 17 and 18, 51 are held bearing against one another by means of a component of the spring force.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Interlock device, comprising a locking slide which is displaceable in a receiving bore of a housing, a locking element having at least one positive engagement member, and being movable between an interlock position in which said engagement member is in mutual engagement with a mating engagement member to be interlocked, and a free position in which said engagement member and said mating engagement member are out of engagement, said locking slide being coupled to an adjusting member which is received movably in a housing bore of said housing and which interacts with said locking slide to cause said engagement member to move between said interlock position and said free position, said adjusting member being actuatable by an axial piston of a pressure medium actuator having a cylinder bore which is fixedly mounted to said housing and which has a longitudinal axis perpendicular to and in a common plane with a longitudinal axis of said receiving bore for the locking slide, said locking slide and said adjusting member being coupled by a first tappet adapted to cooperate therewith to cause said locking element to move into the interlock position, said first tappet being articulated at a first end in a ball joint on the locking slide and at a second end in a ball joint on the adjusting member in such a manner that during operation a longitudinal axis of the first tappet passes through a dead center position parallel to the longitudinal axis of said receiving bore for the locking slide, a second tappet adapted to actuate said locking element and articulated at a first end in a ball joint on the adjusting member and at a second end in a ball joint on the locking slide in such a manner that during operation a longitudinal axis of the second tappet passes through a dead center position parallel to the longitudinal axis of said receiving bore for the locking slide, each of said tappets having two end positions, one corresponding to the interlock position and another corresponding to the free position of the locking slide respectively, in which positions the longitudinal axes of said tappets form an angle with the longitudinal axis of said receiving bore for the locking slide, said angle being relatively greater in one end position and relatively smaller in the other end position, stop means for limiting the movement of said adjusting member axially within said housing bore between a first end position corresponding o said interlock position of the locking slide and a second end position corresponding to the free position thereof, wherein the locking slide has a passage therethrough, with said adjusting member being disposed and movable therein longitudinally along said housing bore, wherein said first tappet is operable to cause said locking slide to move said locking element into the interlock position and said second tappet is operable to cause said locking slide to move said locking element into the free position, said first and second tappets being so arranged that when said first tappet is in an end position which forms a relatively greater angle with the longitudinal axis of said receiving bore, said second tappet is in an end position which forms a relatively smaller such angle, and when said first tappet is in an end position which forms a relatively smaller such angle, said second tappet is in an end position which forms a relatively greater such angle, wherein the ball joint associated with at least one end of each said tappet is mounted against an elastically compressible member in such a manner as to be longitudinally displaceable by said tappet, and wherein a length of each said tappet relative to a longitudinal distance between said ball joints associated with said tappet is such that said longitudinally displaceable ball joint associated with said tappet is longitudinally displaced against said compressible member by said tappet when said tappet is in a dead center position.

* * * * *